(12) United States Patent
Ichikawa et al.

(10) Patent No.: US 6,578,263 B2
(45) Date of Patent: Jun. 17, 2003

(54) METHOD OF MANUFACTURING A WIRE HARNESS

(75) Inventors: Hiroshi Ichikawa, Shizuoka (JP); Masashi Kitada, Shiuzuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/893,726

(22) Filed: Jun. 29, 2001

(65) Prior Publication Data

US 2002/0023345 A1 Feb. 28, 2002

Related U.S. Application Data

(60) Continuation-in-part of application No. 09/235,282, filed on Jan. 22, 1999, which is a division of application No. 08/852,501, filed on May 7, 1997, now Pat. No. 6,031,184.

(51) Int. Cl.$^7$ ................................................ H01R 43/00
(52) U.S. Cl. ........................................... 29/870; 29/743
(58) Field of Search ........................... 29/868, 869, 870, 29/743; 269/21; 174/72 R, 72 A, 72 TR, 72 C

(56) References Cited

U.S. PATENT DOCUMENTS 5,895,889 A * 4/1999 Uchida et al. ............ 174/72 A

* cited by examiner

*Primary Examiner*—Gregory Huson
*Assistant Examiner*—Peter deVore
(74) *Attorney, Agent, or Firm*—Finnegan, Henderson, Farabow, Garrett & Dunner, L.L.P.

(57) ABSTRACT

A wire harness includes a circuit unit having a plurality of electric wires with a predetermined path, a first soft sheet material formed into the shape as that of the predetermined path and a second soft sheet material adhesively joined to the first soft sheet material so that the circuit unit is interposed between the first and the second soft sheet materials.

3 Claims, 4 Drawing Sheets

FIG.6A
FIG.6B
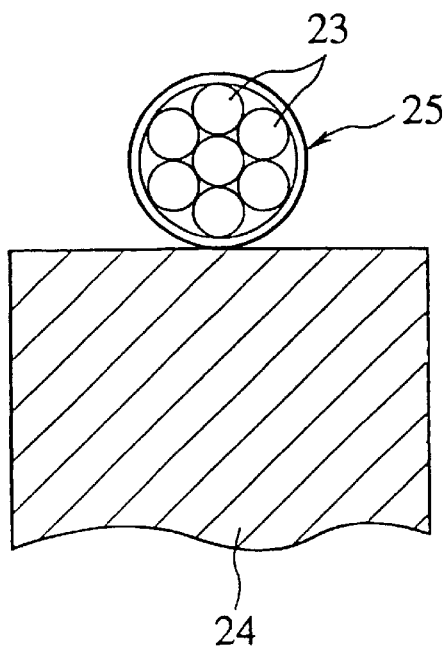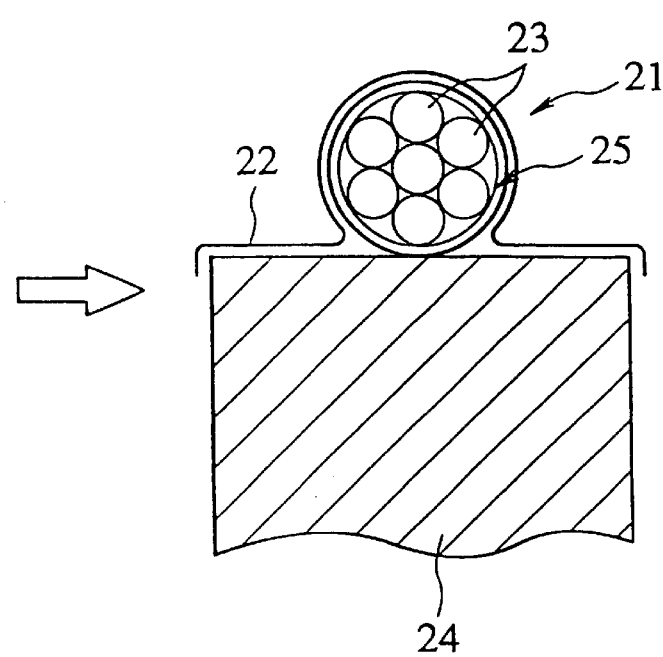

METHOD OF MANUFACTURING A WIRE HARNESS

CROSS-REFERENCE TO RELATED APPLICATIONS

This is a continuation-in-part of U.S. application Ser. No. 09/235,282, filed Jan. 22, 1999, which is a division of U.S. application Ser. No. 08/852,501, filed May 7, 1997, now U.S. Pat. No. 6,031,184.

BACKGROUND OF THE INVENTION

1. Field of the Invention

The present invention relates to a wire harness in which a circuit unit having a plurality of electric wires are interposed with a soft sheet material, and a method of manufacturing the same.

2. Description of the Related Art

As a related art of wire harnesses, the International Patent Application Laid-Open No. WO-92/05011 based on Patent Cooperation Treaty discloses a technique of the wire harness which is a method of mounting a wire harness distributed in an automobile door. The wire harness forms a unit having a rigid-shape structure of a carrier and constituent parts, and the unit is finally mounted at a predetermined position of the automobile door to be equipped with the constituent parts.

More specifically, a mold table corresponding to the shape of an automobile door has grooves and projections having the same shapes as those of the shape of the automobile door and formed therein, and is of a vacuum-mold type. Electric wires and a connector serving as constituent parts are set at a predetermined position and then covered with a plastic foil. The plastic foil is heated to be in a plastic state, and the mold table is set in a vacuum state. The constituent parts are partially wrapped with the plastic foil and then fixed in the automobile door. Thereafter, the excessive portion is cut by seizures to form a wire harness.

In a mounting unit using the wire harness, the electric wires are wrapped with the plastic foil to be distributed in the automobile door. Since the wire harness has a rigid-shape structure wrapped with the plastic foil, when the mounting unit using the wire harness is attached to the automobile door, the constituent parts are finally mounted at a predetermined position of the automobile door.

However, since the plastic foil in which the constituent parts such as the electric wires and the connector are wrapped has a rigid-shape structure, when the mounting unit is attached to the automobile door, the mounting unit interferes with the panel of the automobile door due to vibration so that noise may be generated.

In addition, since the mounting units using the wire harness have rigid-shape structures, the mounting units are conveyed with being in an attaching state to automobile doors and then delivered to an automobile manufacturer. Therefore, since the mounting units are large in volume, conveyance of the mounting units is cumbersome, and a large space is required to store these mounting units.

SUMMARY OF THE INVENTION

The present invention was conceived to solve the above described problem, and the object of the present invention is to provide a wire harness which is free from noise when the wire harness is mounted on a vehicle, which can be delivered with a simple operation, which does not require a large space, and a method of manufacturing the same.

To achieve the object according to a first aspect of the invention, there is provided a wire harness comprising a circuit unit having a plurality of electric wires, and at least one soft sheet material with which the circuit unit is distributed on a predetermined path and interposed in an adhesion state.

In this wire harness, since a circuit unit having a plurality of electric wires is enclosed with a soft sheet material, even if a body panel interferes with the soft sheet material when the wire harness is mounted on the vehicle, no noise is generated. Further, when the wire harness is conveyed, the wire harness is constituted by the soft sheet material, the wire harness is small in volume because it can be folded. Since the wire harness can be made compact, the wire harness does not require a large space for storing.

According to a second aspect of the invention, as it depends from the first aspect, the circuit unit is distributed on the predetermined path and interposed between two soft sheet materials which are adhesively joined to each other.

In this wire harness, since the circuit unit is interposed between the two soft sheet materials, the circuit unit can be reliably made water-proof.

According to a third aspect of the invention, as it depends from the first or second aspects, an adhesive means is coated on only a joint portion between the soft sheet material and the circuit unit.

In this wire harness, since the adhesive means is coated only on the joint portion between the soft sheet material and the circuit unit, no adhesive means need be coated on an unnecessary portion. Therefore, manufacturing cost can be reduced.

According to a fourth aspect of the invention, as it depends from the second or third aspects, the other one of the two soft sheet materials is formed into the same shape as that of the distribution path of the circuit unit.

In this wire harness, when the circuit unit is to be distributed on a predetermined path, the circuit unit can be distributed on the predetermined path by placing the circuit unit on one soft sheet material. For this reason, the circuit unit can be easily distributed on the predetermined path. Therefore, workability is improved.

According to a fifth aspect of the invention, as its depends from one aspect among the first to fourth aspects, the soft sheet material is adhered to a panel of a door, and the circuit unit is distributed in the door.

In the wire harness, the soft sheet materials having the circuit unit interposed therebetween are soft. For this reason, when the wire harness interferes with the panel of the door, no noise is generated.

According to a sixth aspect of the invention, there is provided a method of manufacturing a wire harness, comprising the steps of distributing a circuit unit having a plurality of electric wires on a predetermined path on a vacuum forming die, coating a soft sheet material on the circuit unit, and sucking out air between the circuit unit and the soft sheet material to enclose the circuit unit while the soft sheet material is in an adhesion state.

In the method of manufacturing a wire harness, the circuit unit is interposed between the soft sheet materials while being distributed on a predetermined path to manufacture a wire harness.

According to a seventh aspect of the invention, there is provided a method of manufacturing a wire harness, comprising the steps of placing one soft sheet material of two soft sheet materials on a vacuum forming die, distributing a circuit unit having a plurality of electric wires on a predetermined path on the soft sheet material into a flat shape, coating the other soft sheet material on the one of soft sheet material of the two soft sheet materials and the circuit unit, and sucking out air between the two soft sheet materials to adhesively join the two soft sheet materials so that the two soft sheet materials interpose the circuit unit therebetween.

According to the method of manufacturing a wire harness, the two soft sheet materials can be adhesively joined to each other to interpose the circuit unit therebetween. According to the method of manufacturing a wire harness, since the circuit unit is interposed between the soft sheet materials, noise can be prevented from being generated when the wire harness is mounted on a vehicle. Since the wire harness can be folded, the style of packing in delivery can be made compact, and a large space is not required to store the wire harness.

The above and further objects and novel feature of the present invention will more fully appear from the accompanying drawings and the detailed descriptions of the preferred embodiments.

BRIEF DESCRIPTION OF THE DRAWINGS

FIG. 6A is a sectional view showing the wire harness on a vacuum forming die; and FIG. 6B is a sectional view showing a state wherein a wire harness according to another embodiment of the present invention is wrapped with a soft sheet material.

DETAILED DESCRIPTION OF THE PREFERRED EMBODIMENTS

Figure 1:
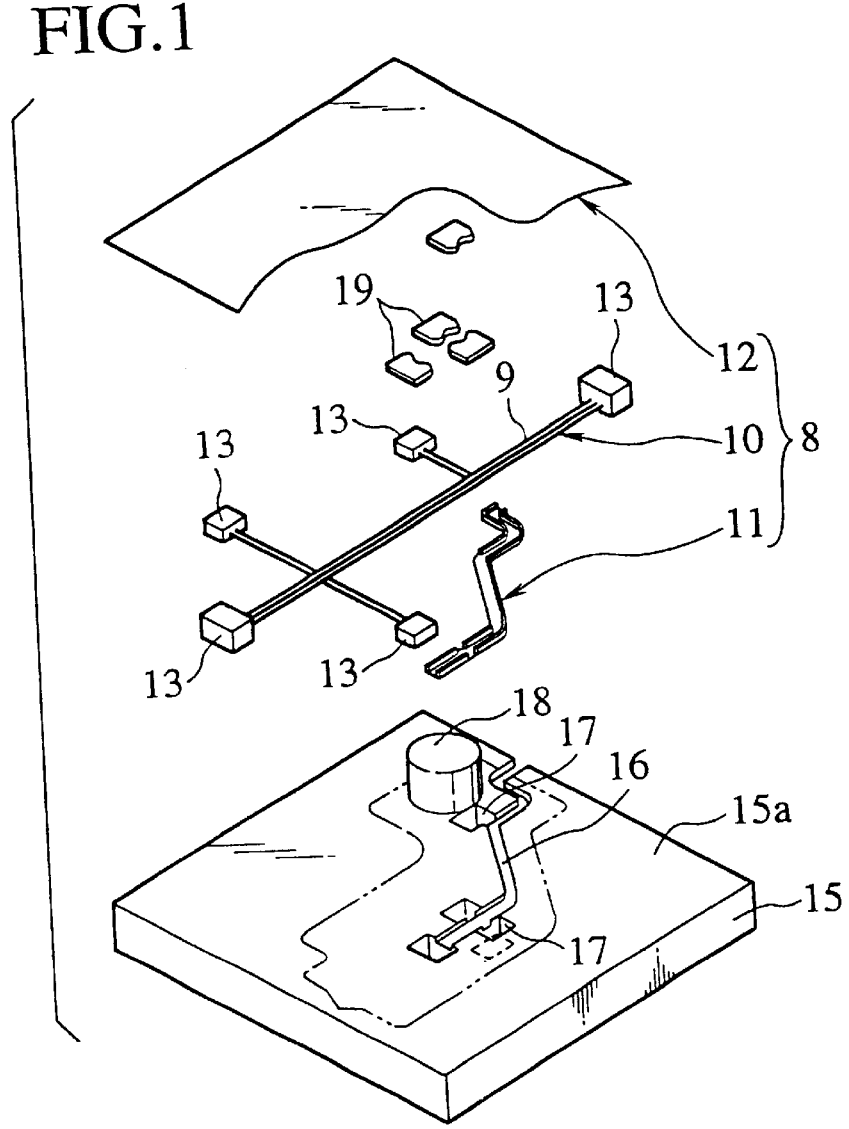
FIG. 1 is an exploded perspective view showing a wire harness according to the present invention.
Figure 2:
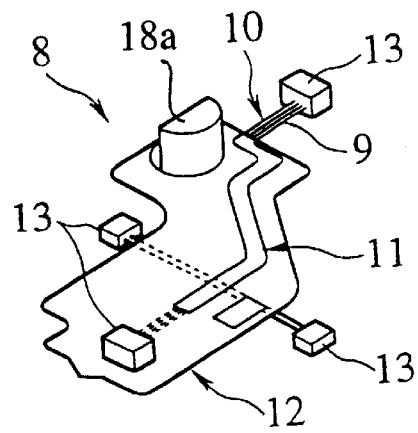
FIG. 2 is a perspective view showing a completed wire harness.

Embodiments of a wire harness according to the present invention and a method of manufacturing the same will be described below with reference to the drawings. FIG. 1 is an exploded perspective view showing a wire harness 8 according to the embodiment, and a vacuum forming die 15 for manufacturing the wire harness 8, and FIG. 2 is a perspective view showing the wire harness 8 in a complete state. The wire harness 8 in this embodiment is distributed in an automobile door.

As shown in FIGS. 1 and 2, the wire harness 8 of the embodiment is constituted by a circuit unit 10 having a plurality of electric wires 9 and two soft sheet materials 11 and 12 between which the circuit unit 10 distributed on a predetermined path and interposed in an adhesion state.

In the circuit unit 10, the plurality of electric wires 9 are formed into a flat shape to be distributed on a predetermined path. Connectors 13 are connected to the end portions of the electric wires 9, respectively. The circuit unit 10 is distributed on the predetermined path to be placed on the soft sheet material 11 of the two soft sheet materials 11 and 12.

Figure 3:
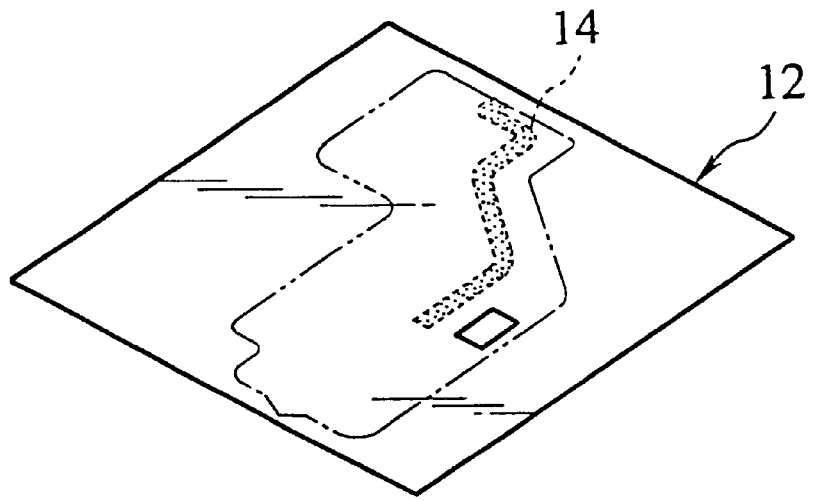
FIG. 3 is a perspective view showing one of two soft sheet materials.

The soft sheet material 11 of the two soft sheet materials 11 and 12 is molded into the shape of the path on which the circuit unit 10 is distributed. The soft sheet material 11 is made of a soft film (thickness: 200 micron meter or less) consisting of a thermal plastic resin. The soft sheet material 11 is molded into a predetermined shape while being heated, so that the soft sheet material 11 is formed into a predetermined shape while being kept soft. The soft sheet material 12 joined to the soft sheet material 11, as shown in FIG. 3, is formed into a rectangle larger than the soft sheet material 11. Similarly, the soft sheet material 12 is made of a soft film consisting a thermal plastic resin. An adhesive means, especially, a hot-melt adhesive means is coated on only a joint portion 14 between the soft sheet material 12 and the circuit unit 10.

Here, the difference between softness and hardness will be described below. For example, assume that vinyl chloride is used as a base material, and that a phthalate-based material, e.g., ester phthalate is used as a plasticizer. In this case, the soft material contains 15 or more parts of plasticizer with respect to 100 parts of base material. A half-hard material contains 5 to 15 or less parts of plasticizer with respect to 100 parts of base material. A hard material contains 0 to 5 parts of plasticizer with respect to 100 parts of base material. The soft material in this specification contains 30 to 60 parts of plasticizer with respect to 100 parts of base material, i.e., vinyl chloride.

A method of manufacturing the wire harness will be described below. In this manufacturing method, the soft sheet material 11 and the soft sheet material 12 are adhesively joined to each other by using a vacuum forming die 15. As shown in FIG. 1, a groove 16 having the same shape as the distribution shape of the circuit unit 10 is formed in an upper surface 15a of the vacuum forming die 15, and a plurality of openings 17 are formed around the groove 16. A columnar projection portion 18 is formed on the vacuum forming die 15.

Figure 4:
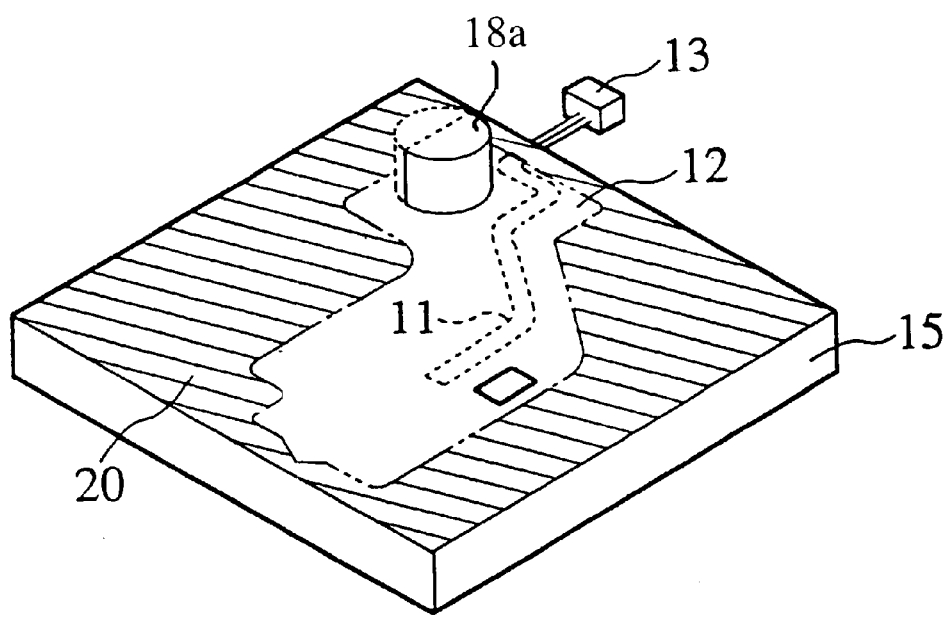
FIG. 4 is a perspective view showing the two soft sheet materials brought into tight contact with each other and joined to each other on a vacuum forming die.

After the soft sheet material 11 is placed to be matched with the groove 16 of the vacuum forming die 15, the circuit unit 10 is distributed on a predetermined path of the soft sheet material 11 to be made flat. The openings 17 are closed by brackets 19. The other soft sheet material 12 is covered on the soft sheet material 11 and the circuit unit 10, and, as shown in FIG. 4, air between the soft sheet materials 11 and 12 is sucked out. In this case, the adhesive means is coated on only the joint portion 14 between the soft sheet material 11 and the circuit unit 10. When the air between the soft sheet materials 11 and 12 is sucked out, the adhesive means is melted by heat to adhere the soft sheet material 12 to the circuit unit 10.

When the air between the soft sheet materials 11 and 12 is sucked out, the soft sheet materials 11 and 12 are adhesively joined to each other to interpose the circuit unit 10 therebetween. Also at this time, the wire harness 8 is formed with a three-dimensional shape by the projecting columnar portion 18 on the vacuum forming die 15. The shape so formed initially conforms to the full cylindrical shape of the portion 18. Thereafter unnecessary portions 20 represented by the hatched area in FIG. 4 are cut off. In addition, a half portion of the cylindrical shape formed by the mold portion 18 is cut off at the dotted line in FIG. 4, thereby completing the wire harness 8 with the three-dimensioned half cylinder 18a, as shown in FIG. 2.

In this wire harness 8, the circuit unit 10 is interposed between the soft sheet materials 11 and 12. For this reason, when the wire harness 8 is mounted on a vehicle, i.e., a door panel, even if the soft sheet materials 11 and 12 interfere with the door panel or the like, no noise is generated.

Figure 5A:
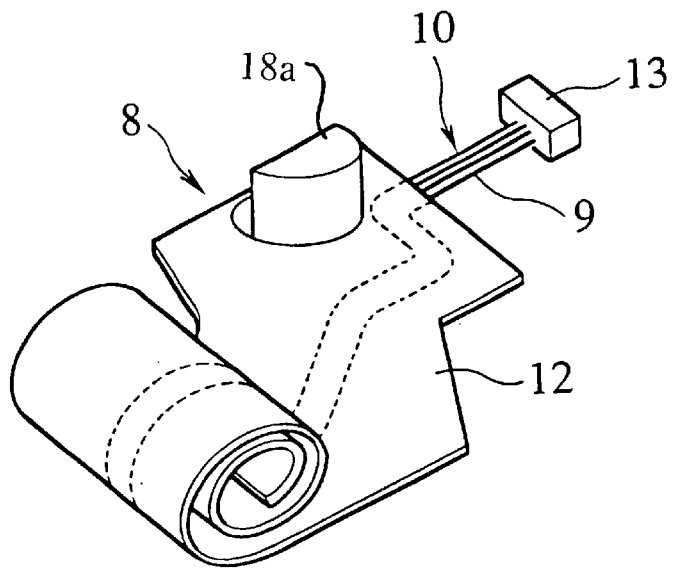
FIG. 5A is a perspective view showing a state in the middle of a rounding process in which a wire harness is wound to be a compact style of packing.
Figure 5B:
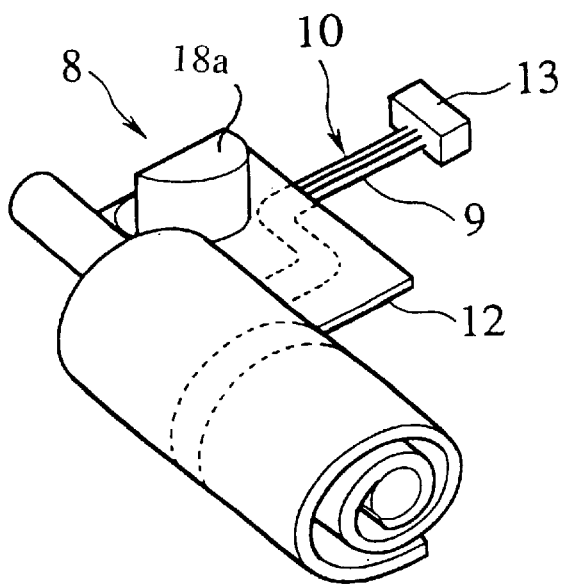
FIG. 5B is a perspective view showing a state at the end of the rounding process.

Since the wire harness 8 according to this embodiment uses the soft sheet materials 11 and 12, the wire harness 8 can be rolled from the state shown in FIG. 2 to the state shown in FIGS. 5A and 5B. For this reason, the wire harness 8 having a compact style of packing can be delivered to an automobile manufacturer, and does not require a large space for storing. In addition, when the wire harness 8 is conveyed, the wire harness 8 can be handled while being kept folded. For this reason, the wire harness 8 can be easily handled. In this case, since the shape of the wire harness 8 in an attaching state to a door panel is kept the same as when the folded wire harness 8 is developed, the wire harness 8 can be attached to the door panel without any special process.

In the wire harness 8 according to this embodiment, since the two soft sheet materials 11 and 12, the circuit unit 10 can be reliably made water-proof.

In this embodiment, since an adhesive means is coated on the joint portion 14 between the soft sheet material 12 and the circuit unit 10, no adhesive means is wasted, and manufacturing cost can be reduced. Since no adhesive is provided between the soft sheet materials 11 and 12 and the vacuum forming die 15 during a vacuum forming operation, the soft sheet material 12 is not adhered to the vacuum forming die 15. Therefore, the soft sheet material 12 can be removed from the vacuum forming die 15, and workability is improved.

Since the soft sheet material 11 is molded into the shape of the distribution path of the circuit unit 10, when the circuit unit 10 is distributed on the predetermined path, the electric wires 9 may be distributed along the soft sheet material 11. For this reason, the workability of distribution can be improved.

In the wire harness 8 according to this embodiment, the electric wires 9 of the circuit unit 10 interposed between the soft sheet materials 11 and 12 are parallel arranged into a flat shape, when the wire harness is mounted on the door panel, the projection length of the wire harness 8 toward the vehicle room can be reduced.

In the above embodiment, when the thickness of the soft sheet material 11 is set to be larger than that of the soft sheet material 12, the distribution path shape is rigid. For this reason, a mounting shape to the vehicle can be assured. In addition, since the soft sheet material 12 is formed to have a small thickness, the wire harness 8 can be easily bent and folded. When the thickness of the soft sheet material 12 is set to be large, the rigidity of the wire harness 8 as a whole is improved. In particular, with larger thicknesses of the soft sheet material, the wire harness 8 can be rolled and unrolled without plastic deformation so that the special relationship of the connectors 13, the electric wires 9, and the semi-cylindrical projection 18*a* will remain as they were formed on the vacuum forming die 15. For this reason, mounting and assembling operations of the harness 8 on the vehicle can be made easy. Since the rigidity of the wire harness 8 is improved, the wire harness 8 can be easily developed.

The following arrangement may be established. That is, the soft sheet material 11 is adhered to the door panel, and the circuit unit 10 is distributed in the door.

A wire harness 21 according to another embodiment shown in FIGS. 6A and 6B will be described below. The wire harness 21 according to this embodiment, a plurality of electric wires 23 are interposed with one soft sheet material 22. As shown in FIG. 6A, a circuit unit 25 obtained by gathering the plurality of electric wires 23 is placed on a vacuum forming die 24, and the soft sheet material 22 is coated on the resultant structure. The resultant structure is heated and evacuated, and, as shown in FIG. 6B, the circuit unit 25 is wrapped with the soft sheet material 22.

As in the wire harness 8 according to the above embodiment, in the wire harness 21, the soft sheet material 22 is made of the same soft thermal-plastic resin as described in the above embodiment. For this reason, the wire harness 21 can be easily folded, and can made a compact style of packing. Therefore, cumbersome delivery operation and a large space for storing are not required.

In the above embodiments, although the circuit unit 10 and 25 are interposed with the soft sheet materials 11, 12, and 22 with the vacuum forming dies 15 and 24, the circuit unit 10 and 25 may be interposed with the soft sheet materials 11, 12, and 22 with a manual operation.

Since it is apparent that different embodiments can be effected in a wide range without departing from the spirit and scope of the invention, the invention is not limited to the specific embodiment except for limitation made by the accompanying claims.

What is claimed is:

1. A method of manufacturing a wire harness, comprising the steps of:
    placing one of two soft sheets on a vacuum forming die having a groove to establish a predetermined path;
    placing a plurality of electric wires of a circuit unit in the predetermined path on the one soft sheet;
    placing the other of the two soft sheets on the one soft sheet and the plurality of electric wires; and
    evacuating air from between the two soft sheets to adhesively join the two soft sheets so that the two soft sheets enclose the plurality of electric wires.

2. The method of claim 1, wherein the two soft sheets the two soft sheets are formed of a molded thermal plastic resin including a base material and a plasticizer in a ratio of at least 15 parts of plasticizer to 100 parts of base material.

3. The method of claim 2, wherein the ratio of base material and the plasticizer is between 30 to 60 parts of plasticizer to 100 parts of base material.

* * * * *

UNITED STATES PATENT AND TRADEMARK OFFICE
CERTIFICATE OF CORRECTION

PATENT NO.    : 6,578,263 B2
DATED         : June 17, 2003
INVENTOR(S)   : Hiroshi Ichikawa and Masashi Kitada It is certified that error appears in the above-identified patent and that said Letters Patent is hereby corrected as shown below:

Title page,
Item [75], Inventors, the cities of the two Inventors should be changed from "Shizuoka" to read -- Shizuoka-ken --.
After "Prior Publication Data", insert Item:

-- [30]    Foreign Application Priority Data

Jun. 4, 1996      (JP) . . . . . . . . . . . . . . . . . . . P-8-141877 --.

Column 6,
Lines 47-48, delete "the two soft sheets" (second occurrence).

Signed and Sealed this

Twenty-seventh Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO.   : 6,578,263 B2                                              Page 1 of 1
DATED        : June 17, 2003
INVENTOR(S)  : Hiroshi Ichikawa and Masashi Kitada It is certified that error appears in the above-identified patent and that said Letters Patent is hereby corrected as shown below:

Title page,
Item [75], Inventors, (both occurrences) "Shizuoka" should read -- Shizuoka-ken --
After Item [65], Prior Publication Data, insert the following:
-- [30]   Foreign Application Priority Data
Jun. 4, 1996     (JP) ……………….... P-8-141877 --

Column 6,
Lines 47-48, delete "the two soft sheets" (second occurrence).

Signed and Sealed this

Fifteenth Day of June, 2004

JON W. DUDAS
*Acting Director of the United States Patent and Trademark Office*